Patented Mar. 11, 1941

2,234,580

UNITED STATES PATENT OFFICE 2,234,580

SUBSTANTIVE AZO DYESTUFFS

Hans Roos, Leverkusen I. G.-Werk, Germany, assignor to General Aniline & Film Corporation, a corporation of Delaware No Drawing. Application August 31, 1939, Serial No. 292,890. In Germany October 17, 1938

6 Claims. (Cl. 260—159)

The present invention relates to new substantive azo dyestuffs.

In German Patents 629,812, 632,135, 663,550 and several others azo dyestuffs are described which are characterized by the grouping

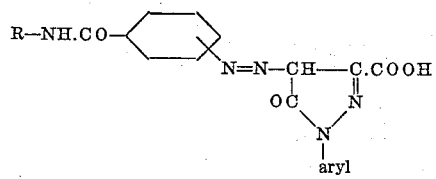

The component R can be either free from azo groups or in case it contains an azo group, it must contain, in order to achieve good dischargeability, either a free hydroxy or NH2-group, or the grouping

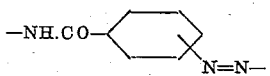

must stand, as in the dyestuffs of German Patent 628,462, in o-position to the azo group. Dyestuffs of the constitution

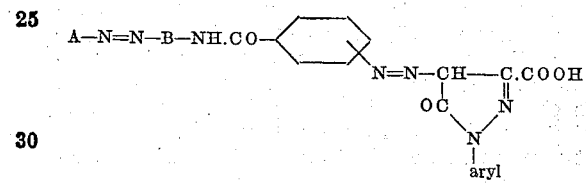

wherein A and B are radicals of the benzene and naphthalene series which are free from OH- and NH2-groups, are not yet described; such dyestuffs are, however, as has been found, of no interest since they are not sufficiently dischargeable.

I have now found that dyestuffs of the constitution

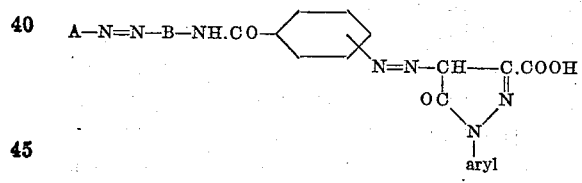

possess a good dischargeability, when in this formula A contains at least a further azo group and B belongs to the benzene series; both A and B are free from OH- and NH2-groups. Accordingly A—N=N— is a radical of a diazo component consisting of components of the benzene or naphthalene series which contains at least one azo group, but is free from OH- and NH2-groups; otherwise, however, A may be substituted by any substituent as, for instance, by SO3H, COOH, alkyl, alkoxy groups, halogen and so on. Also B, which belongs to the benzene series, and the benzene nucleus of the benzoylamino group may be substituted in the same way. The aryl nucleus of the 1-aryl-5-pyrazolone-3-carboxylic acid may likewise bear various substituents especially the NH2-group.

My new dyestuffs can be obtained as follows: A diazotized aminoazo dyestuff, which contains at least one azo group and is free from further amino groups and from OH-groups and the components of which belong to the benzene or naphthalene series, is coupled with a monamine of the benzene series being free from hydroxy groups. This aminodis- or polyazo dyestuff is condensed with a nitrobenzoyl chloride the benzene nucleus of which may contain further substituents; in the condensation product the nitro group is reduced to the amino group and the product thus obtained which may be represented by the formula

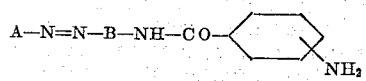

is diazotized and coupled with a 1-aryl-5-pyrazolone-3-carboxylic acid.

The new dyestuffs yield in general yellow-orange to orange-brown shades which are distinguished in addition to the good dischargeability mainly by an excellent fastness to light. In this property they excel the dyestuffs which are described in the above mentioned patents.

In case the new dyestuffs contain in the aryl nucleus of the 1-aryl-5-pyrazolone-3-carboxylic acid a free amino group they may be diazotized, as known, for instance, on the fiber and developed with the usual developers to yield dyeings fast to washing. An improvement of the fastness to washing can also be achieved by the process described in German Patent 631,184 by an aftertreatment with diazotized 1-amino-4-nitrobenzene. In either case by the aftertreatment the good dischargeability is retained and the aftertreated dyeings are likewise distinguished by a very good fastness to light.

The following examples illustrate the invention, without however, restricting it thereto, the parts being by weight.

Examples 30 parts of 2-aminonaphthalene-4.8-disulfonic acid are diazotized with 7 parts of sodium nitrite and 28 parts of hydrochloric acid (19.5° Bé.) and coupled in acetic solution with 11 parts of 1-amino-3-methylbenzene. When the coupling is completed the dyestuff is dissolved in caustic soda lye further diazotized with 8 parts of sodium nitrite and 35 parts of hydrochloric acid and a second time coupled with 11 parts of 1-amino-3-methylbenzene in weakly acid medium obtained by adding sodium carbonate solution. The disazo dyestuff is isolated and dissolved to a neutral solution. Into this solution 18 parts of 4-nitrobenzoyl chloride dissolved in benzene are allowed to run while adding simultaneously sodium carbonate care being taken that the reaction remains approximately neutral. When a test portion can no longer be diazotized 36 parts of crystallized sodium sulfide are added. The reduction begins immediately. When the reaction is finished the reduction product is isolated by adding some sodium chloride. The paste of the aminobenzoylated disazo dyestuff thus obtained is dissolved in hot water, added to ice and 30 parts of hydrochloric acid and diazotized with 7 parts of sodium nitrite. The diazotization is finished after about 2–3 hours and finally coupling with 18 parts of 1-phenyl-5-pyrazolone-3-carboxylic acid is carried out at weakly acid reaction. When the coupling is completed the mixture is rendered alkaline and the dyestuff is isolated. It corresponds in its free state to the following formula

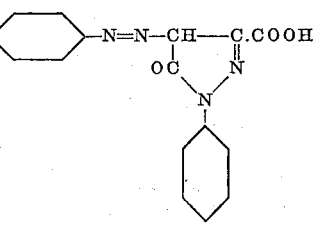

and yields on cotton rather yellowish orange shades of very good fastness to light and of good neutral and alkaline dischargeability.

In this example very many variations are possible without principally altering the procedure. The variations possible, when retaining the above condensation with 4-nitro-benzoyl chloride, reduction of the nitro group to the amino group, diazotization and coupling with 1-phenyl-5-pyrazolone-3-carboxylic acid, become evident from the following table:

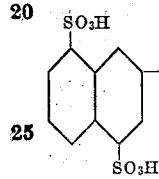

reduced, diazotized→1-phenyl-5-pyrazolone-3-carboxylic acid may stand in m-position and the p-position can be occupied by a methyl or methoxy group, or the p-aminobenzoyl radical may be substituted in the nucleus, for instance, by a methyl group; if this methyl group stands in a position adjacent to the amino group a marked improvement of the fastness to water of the final dyestuff is achieved.

And in the aryl nucleus of the final component, of the 1-aryl-5-pyrazolone-3-carboxylic acid also many variations are possible by which, however, the properties of the dyestuffs are not essentially changed. Thus in the first described dyestuff the 1-phenyl-5-pyrazolone-3-carboxylic acid can be replaced by the 1-sulfophenyl-5-pyrazolone-3-carboxylic acids as they can be obtained from 1-aminobenzene-2,3- or 4-sulfonic acid, or by the pyrazolone-carboxylic acids prepared from the corresponding aminobenzene-carboxylic acids, as well as by pyrazolone-3-carboxylic acids derived from the naphthalene series, for instance, from 2-aminonaphthalene-6-sulfonic acid whereby the properties are not essentially changed. The dyestuffs show either a somewhat increased solubility or the shades are shifted in the direction to red-orange.

Very valuable dyestuffs are obtained if as final component 1-(3'-aminophenyl)-5-pyrazolone-3-carboxylic acid is used. Thus when substituting in the first described dyestuff 1-(3'-aminophenyl)-5-pyrazolone-3-carboxylic acid for 1-phenyl-5-pyrazolone-3-carboxylic acid a dyestuff is obtained which is in the direct dyeing very similar to the first mentioned dyestuff. However, it may be aftertreated on the fiber with diazo-

|  | a | b | c | Shades on cotton |
|---|---|---|---|---|
| 1 | 1-aminobenzene-4-sulfonic acid | 1-aminobenzene-2-sulfonic acid | 1-amino-3-methyl-benzene | Yellow-orange. |
| 2 | 2-aminonaphthalene-4.8-disulfonic acid. | Aniline | Aniline-ω-methane-sulfonic acid (saponified). | Do. |
| 3 | ...do... | 1-amino-2-methylbenzene | ...do... | Do. |
| 4 | ...do... | 1-amino-2,5-dimethylbenzene | ...do... | Do. |
| 5 | ...do... | 1-amino-2-methoxy-5-methylbenzene | 1-amino-3-methylbenzene | Orange. |
| 6 | 2-aminonaphthalene-6.8-disulfonic acid. | ...do... | ...do... | Do. |
| 7 | ...do... | 1-amino-3-methylbenzene | 1-amino-2-methoxy-5-methylbenzene | Red-orange. |
| 8 | ...do... | ...do... | 1-amino-2-methoxybenzene | Reddish-orange. |
| 9 | 1-aminonaphthalene-3.6-disulfonic acid. | ...do... | 1-amino-3-methylbenzene | Orange. |
| 10 | 2-aminonaphthalene-4.8-disulfonic acid. | 1-amino-naphthalene | 1-amino-2-methoxy-5-methylbenzene | Orange-brown. |
| 11 | 1-aminobenzene-3-sulfonic acid | 1-amino-naphthalene-6- or -7-sulfonic acid. | 1-amino-3-methylbenzene | Yellowish-brown. |
| 12 | ...do... | 1-amino-2-ethoxy-naphthalene-6-sulfonic acid. | 1-amino-2-methoxy-5-methylbenzene | Reddish-brown. |

The disazo dyestuff according to 1 of the above table obtained from diazotized amino-azobenzene-disulfonic acid and 1-amino-3-methylbenzene may be further diazotized and coupled, e. g. with 1-amino-3-methylbenzene. When now this trisazo dyestuff is condensed as above with 4-nitrobenzoyl chloride reduced, diazotized and coupled with 1-phenyl-5-pyrazolone-3-carboxylic acid a dyestuff of similar properties is obtained which dyes cotton yellowish-orange shades.

Also in the aminobenzoyl component variations are possible. Thus, for instance, the amino group tized 1-amino-4-nitrobenzene or diazotized on the fiber and developed with 2-hydroxynaphthalene or 1-phenyl-3-methyl-5-pyrazolone whereby orange dyeings of very good fastness to light and washing and good neutral and alkaline dischargeability are obtained. The shades become somewhat more brownish-red if 1-(4'-aminophenyl)-5-pyrazolone-3-carboxylic acid is employed. By a suitable selection of the first and middle components in the manner indicated in the above table the shades can be shifted to red-brown to yellow-brown.

I claim:

1. As new products substantive azo dyestuffs of the general formula

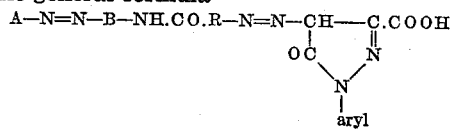

wherein A—N=N— stands for the radical selected from the group consisting of diazo-monoazo components of the benzene and naphthalene series, B and R stand for radicals of the benzene series, A, B and R being free from OH- and $NH_2$-groups.

2. As new products substantive azo dyestuffs of the general formula

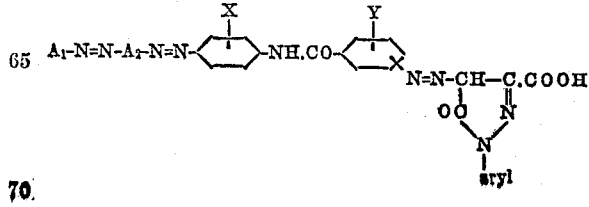

wherein $A_1$ and $A_2$ stand for members selected from the group consisting of radicals of the benzene and naphthalene series, B and R stand for radicals of the benzene series, $A_1$, $A_2$, B and R being free from OH- and $NH_2$-groups.

3. As new products substantive azo dyestuff of the general formula

wherein $A_1$ and $A_2$ stand for members selected from the group consisting of radicals of the benzene and naphthalene series, $A_1$ and $A_2$ being free from OH- and $NH_2$-groups and X and Y stand for members selected from the group consisting of alkyl, alkoxy and halogen.

4. As new product the substantive azo dyestuff corresponding in its free state to the following formula

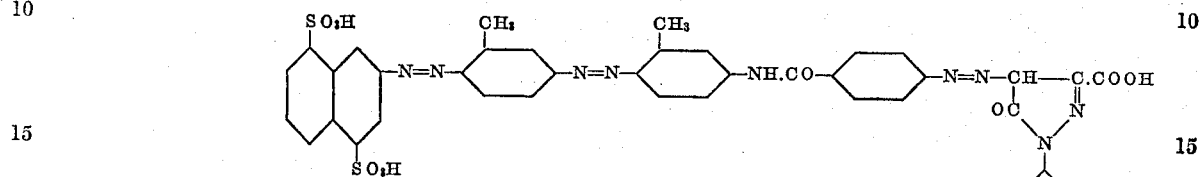
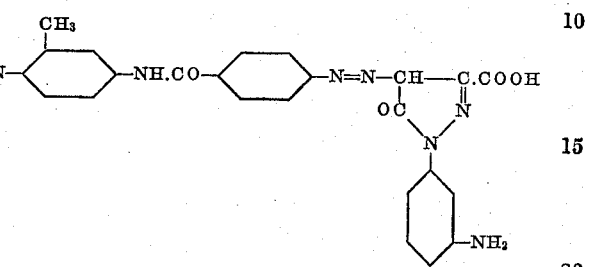

and dyeing cotton yellowish orange shades of very good fastness to light and of good neutral and alkaline dischargeability.

5. As new product the substantive azo dyestuff corresponding in its free state to the following formula

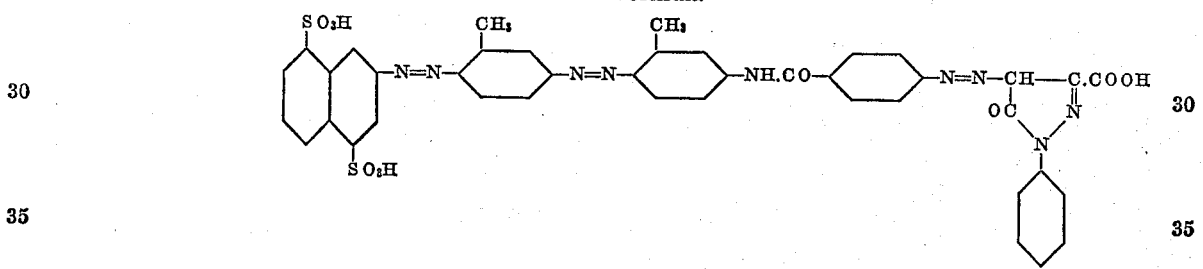
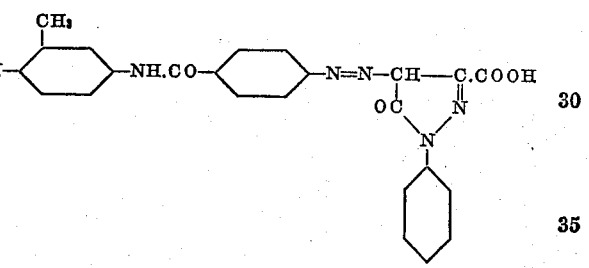

dyeing cotton yellowish orange shades of very good fastness to light and of good neutral and alkaline dischargeability.

6. As new product the substantive azo dyestuff corresponding in its free state to the following formula

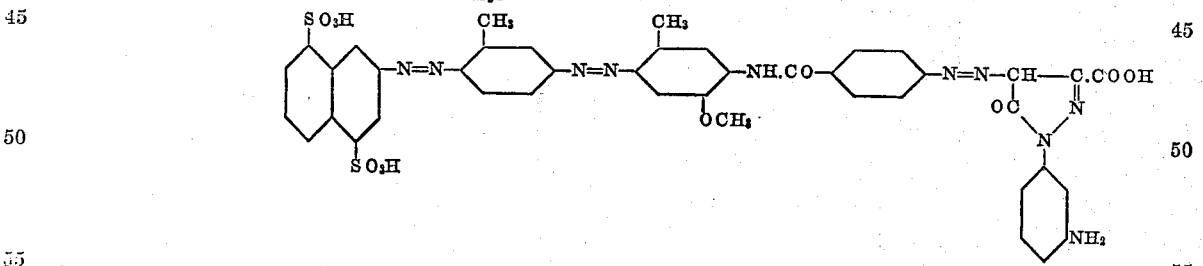
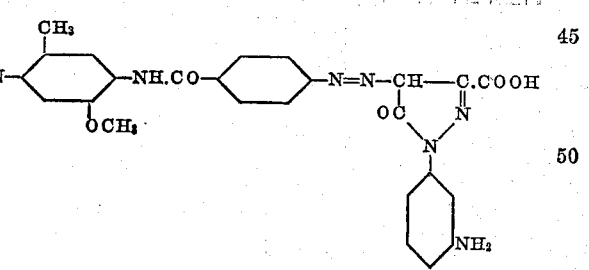

dyeing cotton reddish orange shades of very good fastness to light and of good neutral and alkaline dischargeability.

HANS ROOS.